(12) United States Patent
Brennan et al.

(10) Patent No.: US 11,591,826 B2
(45) Date of Patent: Feb. 28, 2023

(54) STORAGE CONTAINER SECURING SYSTEM

(71) Applicant: APEX COOLERS, LLC, Dallas, TX (US)

(72) Inventors: Sean Brennan, Dallas, TX (US); Craig A. Smith, Argyle, TX (US)

(*) Notice: Subject to any disclaimer, the term of this patent is extended or adjusted under 35 U.S.C. 154(b) by 676 days.

(21) Appl. No.: 15/997,494

(22) Filed: Jun. 4, 2018

(65) Prior Publication Data
US 2018/0340356 A1 Nov. 29, 2018

Related U.S. Application Data

(63) Continuation-in-part of application No. 29/605,327, filed on May 25, 2017, now Pat. No. Des. 840,281.

(60) Provisional application No. 62/661,143, filed on Apr. 23, 2018, provisional application No. 62/514,716, filed on Jun. 2, 2017.

(51) Int. Cl.
| | |
|---|---|
| *E05B 73/00* | (2006.01) |
| *B60R 9/06* | (2006.01) |
| *B60D 1/58* | (2006.01) |
| *E05B 65/52* | (2006.01) |
| *B60D 1/00* | (2006.01) |

(52) U.S. Cl.
CPC ............ *E05B 73/0023* (2013.01); *B60D 1/58* (2013.01); *B60D 1/583* (2013.01); *B60R 9/06* (2013.01); *B60R 9/065* (2013.01); *E05B 65/52* (2013.01); *E05B 73/00* (2013.01); *E05B 73/0005* (2013.01); *B60D 2001/001* (2013.01)

(58) Field of Classification Search
CPC .. E05B 73/00; E05B 73/0005; E05B 73/0023; E05B 65/52; E05B 65/5246; E05B 65/5269; B60R 9/00; B60R 9/06; B60R 9/065; B60D 1/58; B60D 1/583; B60D 2001/001
See application file for complete search history.

(56) References Cited

U.S. PATENT DOCUMENTS

| | | | | | |
|---|---|---|---|---|---|
| 1,329,869 | A | * | 2/1920 | Willringhaus | E05B 65/50 292/247 |
| 1,455,625 | A | * | 5/1923 | Langenau | E05C 19/14 292/247 |
| 3,698,753 | A | * | 10/1972 | Atkinson | E05C 19/14 292/247 |
| 3,741,132 | A | * | 6/1973 | Blower | E05G 1/005 109/52 |
| 3,936,082 | A | * | 2/1976 | Swanson | E05C 19/14 292/113 |
| 4,191,034 | A | * | 3/1980 | Froess | B60R 16/04 180/68.5 |

(Continued)

*Primary Examiner* — Christopher J Boswell
(74) *Attorney, Agent, or Firm* — Bell Nunnally & Martin LLP

(57) ABSTRACT

A storage container securing system, in one embodiment, may include a base for receiving at least a portion of a storage container, such as a cooler, and a shelf adjustably positioned within the base to adjust the location of the storage container. In another embodiment, a storage container securing system is described having slidable inserts configured to matingly engage a slot in a storage container. In another embodiment, a storage container securing system is described having a receiving slot configured to receive a protrusion of a storage container.

5 Claims, 15 Drawing Sheets

(56) References Cited

U.S. PATENT DOCUMENTS

| | | | | |
|---|---|---|---|---|
| 4,495,787 A * | 1/1985 | Comstock | ............... | B60R 16/04 |
| | | | | 248/553 |
| 4,758,031 A * | 7/1988 | Wolf | ................... | E05C 19/105 |
| | | | | 292/111 |
| 5,215,234 A * | 6/1993 | Pasley | ...................... | B60R 9/06 |
| | | | | 224/508 |
| 5,868,295 A * | 2/1999 | Carriere | ................... | B60R 9/00 |
| | | | | 224/404 |
| 6,050,616 A * | 4/2000 | Evans | ................. | E05C 19/105 |
| | | | | 292/109 |
| 6,298,695 B1 * | 10/2001 | Vezina | ............... | E05B 73/0082 |
| | | | | 248/551 |
| 6,547,293 B1 * | 4/2003 | Cheng | .................... | E05C 19/14 |
| | | | | 292/113 |
| 6,962,067 B1 * | 11/2005 | Chapman | ............... | E05B 73/00 |
| | | | | 70/158 |
| 7,156,273 B2 * | 1/2007 | Morris | ..................... | B60R 9/06 |
| | | | | 108/14 |
| 8,567,650 B2 * | 10/2013 | Read | ...................... | B60R 9/065 |
| | | | | 224/404 |
| 9,120,427 B1 * | 9/2015 | Wolski | .................... | B60R 9/065 |
| 9,352,698 B2 * | 5/2016 | Romanelli | ............... | B60R 9/06 |
| 9,353,558 B2 * | 5/2016 | Hatton | ................... | E05C 19/10 |
| 10,112,545 B1 * | 10/2018 | Gaskins | ................ | B60R 9/065 |
| 10,227,047 B2 * | 3/2019 | Purvis | ..................... | B60R 9/00 |
| 10,231,524 B2 * | 3/2019 | Tonelli | ...................... | E05C 3/12 |
| 10,384,589 B2 * | 8/2019 | Llewellyn | ................ | B60P 7/06 |
| 10,550,609 B2 * | 2/2020 | Llewellyn | ............... | E05B 73/00 |
| 10,865,015 B2 * | 12/2020 | Brennan | ................... | B60R 9/06 |
| 2013/0026171 A1 * | 1/2013 | James, Jr. | ............... | B67D 1/06 |
| | | | | 220/592.2 |

* cited by examiner

STORAGE CONTAINER SECURING SYSTEM

CROSS-REFERENCE TO RELATED APPLICATIONS

The present application claims the benefit under 35 U.S.C. § 119(e) of U.S. Provisional Patent Application Ser. No. 62/514,716, filed Jun. 2, 2017, entitled "Storage Container Securing System," which is hereby incorporated by reference for all purposes; and U.S. Provisional Patent Application Ser. No. 62/661,143, filed Apr. 23, 2018, entitled "Storage Container Securing System," which is hereby incorporated by reference for all purposes. The present application claims the benefit under 35 U.S.C. § 120 of U.S. Design patent application Ser. No. 29/605,327, filed May 25, 2017, entitled "Slidable Insert," which is hereby incorporated by reference for all purposes.

BACKGROUND

Technical Field

This disclosure relates to a system to secure a storage container at a location.

History of Related Art

Coolers and other storage containers are often stored in open environments where they are accessible to users. For example, coolers are often stored in an open truck bed of a pickup truck so that the cooler is easily accessible to users. Unfortunately, storing a cooler or other storage container in an open environment, such as a truck bed, occasionally permits those with poor intentions to access the cooler and/or steal the cooler. Stolen coolers and other storage containers are expensive and inconvenient to replace. It would be beneficial to have a mechanism for securing a cooler or other storage container to a surface of an open environment, such as a truck, boat, or UTV, so the container cannot be easily stolen and so that the contents of the container are still easily accessible to the container owner.

SUMMARY OF THE INVENTION

In a first aspect, there is provided a storage container securing system that includes a base for receiving at least a portion of a storage container. In some embodiments, the storage container may include a protrusion and the housing may include a slot configured to receive the protrusion therein. The system may also include a coupling member that is adjustable and coupleable to a storage container to secure the storage container. The system may also include a locking member.

In a second aspect, there is provided a storage container securing system that includes a storage container having a slot therein for receiving one or more slidable inserts positioned within the base to secure the storage container. In some embodiments, the slidable inserts may be removably secured to the base. The system may also include a coupling member that is coupleable to a storage container to secure the storage container to the one or more slidable inserts. The coupling member may include an adjustable locking member.

Other aspects, features, and advantages will become apparent from the following detailed description when taken in conjunction with the accompanying drawings, which are part of this disclosure and which illustrate, by way of example, principles of the inventions disclosed.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
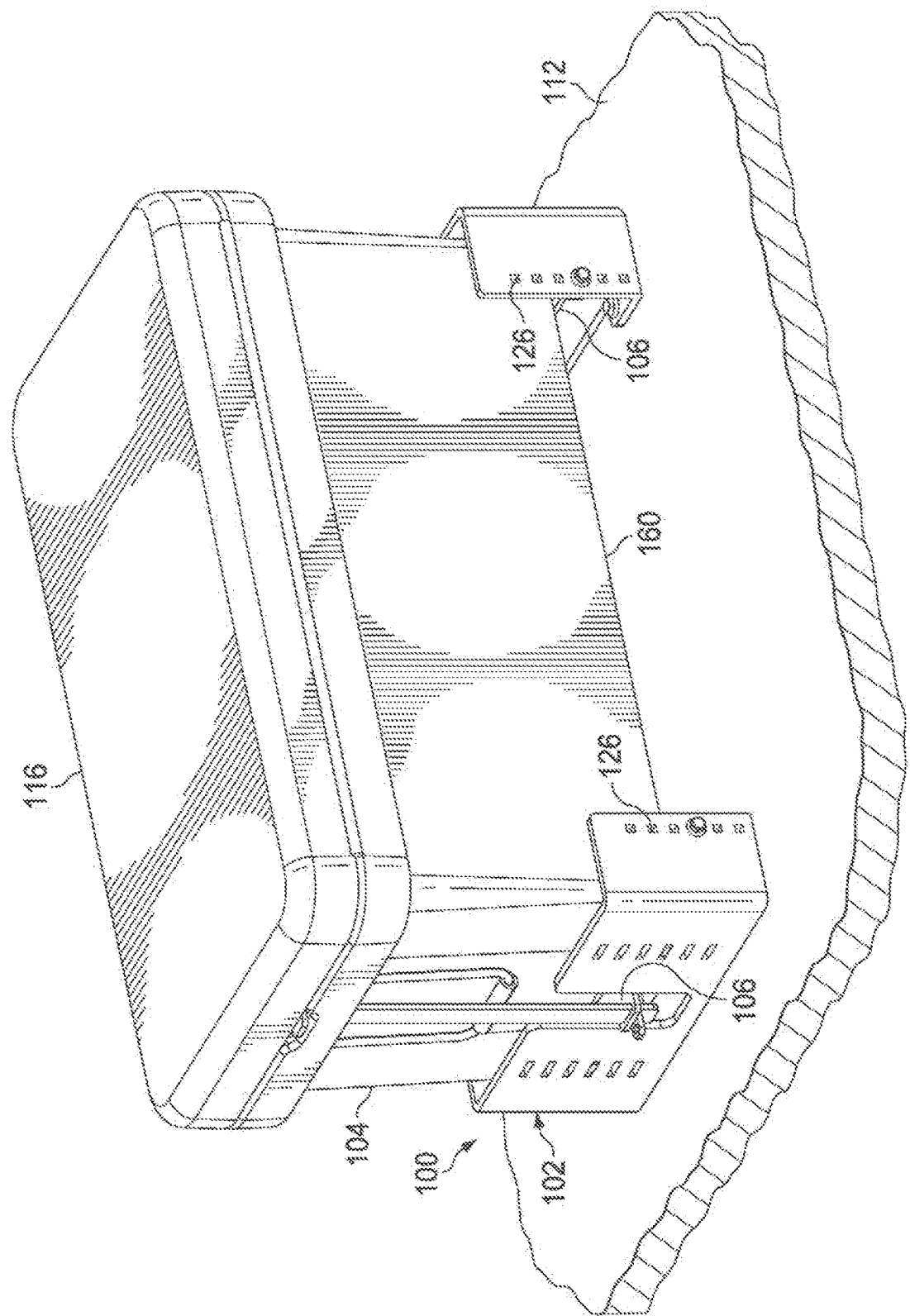
FIG. 1 is a perspective view of an embodiment of a storage container securing system secured to an object in accordance with this disclosure.

FIG. 1 illustrates an embodiment of a securing system 100 that includes a base 102 for securing a storage container 104, such as a cooler, toolbox, or other container; a shelf 106 that may be adjustable within the base 102; one or more coupling members to couple the storage container 104 to the base 102. As shown in FIG. 1, the securing system 100 may be configured to be mounted to a surface 112 located in an open environment, such as a generally flat surface of a truck bed, boat hull, or other object, so that a storage container 104 located in the securing system 100 is easily accessible to the container owner and other users. The storage container 104 is secured to the securing system 100 so that a lid 116 of the container 104 may still be accessible to the container owner while the container 104 is secured to the system 100. As will be described in more detail below, the adjustable shelf 106 of the securing system 100 may allow a user to adjust the vertical position the storage container 104 for ease of accessibility. For example, in some cases, the securing system 100 may be secured to a bed of a pickup truck and the user may position the shelf 106 so that the storage container 104 is easily accessible over the walls of the bed of the pickup truck. As will be described in more detail below, in some embodiments, a user can secure a storage container 104 to the securing system 100 by inserting the coupling members through pre-existing slots in the storage container 104. The user can then easily lock the securing system 100 to the container 104 by securing the coupling members with a locking device, such as a combination lock (not shown). Thus, the securing system 100 facilitates securement of the container 104 to the base 106 while also facilitating easy removal of the container 104 from the base 106.

Referring still to FIG. 1, the securing system 100 includes a base 102 that is configured to receive a bottom portion 160 of a storage container 104, such as a cooler, toolbox, or other storage container. The base 102 includes a vertical wall that extends upwardly from a floor contacting portion of the base 102. In some embodiments, the vertical wall extends upward from at least part of the perimeter of the floor contacting portion. In some embodiments, the vertical wall includes one or more sets of vertically aligned openings 126 to allow a user to adjust the vertical position of the shelf 106 within the base 102. As shown in FIG. 1, the base 102 can be secured to a separate generally flat surface 112, such as a bed of a pickup truck, so that the securing system 100 and a storage container 104 attached thereto cannot be removed from the surface. In some embodiments, for example, the floor contacting portion of the base 102 is secured to a separate surface using one or more bolts. In other embodiments, the base 102 is integrated into a separate surface, such as a bed of a pickup truck, as will be described in more detail below.

Figure 2:
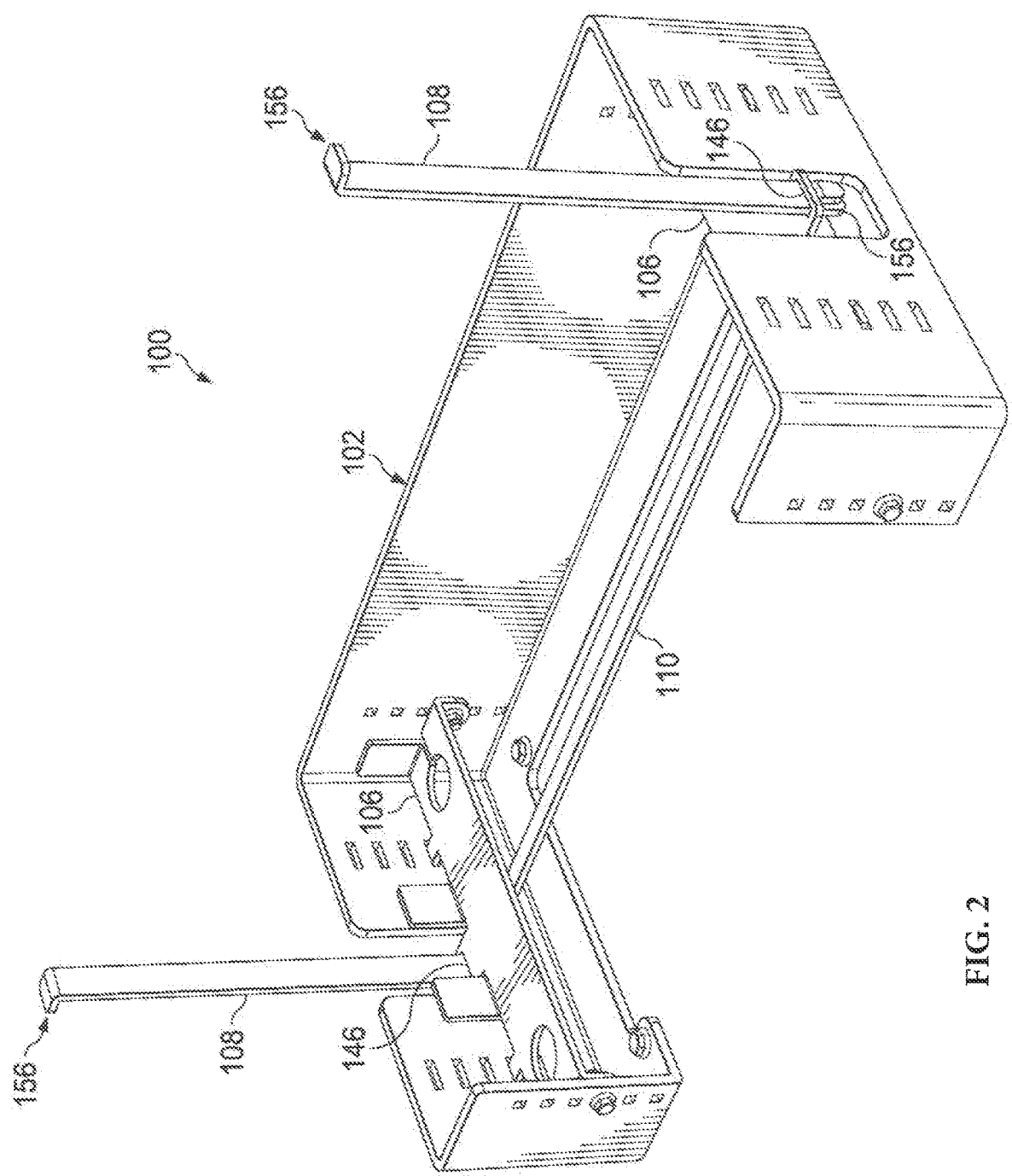
FIG. 2 is another perspective view of an embodiment of a storage container securing system in accordance with this disclosure.

Referring now to FIG. 2, an embodiment of the shelf 106 of the securing system 100 is shown configured to receive a bottom portion of a storage container when the storage container is positioned within the base 102. In some embodiments, the shelf 106 is adjustable in the base 102 by securing the shelf 106 to a group of openings selected from the series of vertically-aligned openings. In some embodiments, the floor contacting portion and the vertical walls may have a U-shaped cross-section with a central opening when viewed from above. In other embodiments, the base 102 may form a complete rectangle and thus the vertical wall and the floor contacting portion extend around the entire perimeter of the base 102. In other embodiments, the floor contacting portion may extend across the entire bottom surface of the base 102 and not include a central opening. In other embodiments, the base 102 has other shapes and sizes to conform to the shape and size of various storage containers, such as coolers, plastic containers, metal containers or other containers with strap slots or openings.

In some embodiments, the shelf 106 includes a first shelf part on one end of the base 102 and a second shelf part on an opposite end of the base 102. In some embodiments, a lateral locking member 110 may couple the two shelf parts together or may be disposed below the two shelf parts to facilitate locking the storage container in place. In some embodiments, the first shelf part and the second shelf part may include one or more openings configured to receive feet of a storage container (not shown), such as a cooler. In some embodiments, the shelf 106 may include vertical tabs to help position the storage container 104 on the shelf 106. While the shelf 106 illustrated in FIG. 2 includes multiple, separate parts (i.e. the first shelf part and the second shelf part), in other embodiments the shelf 106 may be a single-piece that extends across the length of the base 102. In yet other embodiments, the shelf 106 may include more than two separate parts. In some embodiments, shelf 106 may include a protrusion at each end thereof that includes a securing opening 146. In some embodiments, the securing openings 146 may be rectangular in shape and configured to receive coupling members 108, as will be described in more detail below. In some embodiments, the coupling members 108 include protrusions 156 on each end thereof, such as stop members on a first end and locking tabs on an opposite second end thereof. As shown in FIG. 2, the base 102, the shelf 106, the coupling members 108, and the lateral locking member 110 are shown in an assembled configuration with the container 104 removed for clarity. The coupling members 108 are positioned within the securing openings 146 of the shelf 106 such that the protrusion 156 at a first end of the coupling members 108 extends vertically from the securing openings 146.

Figure 3:
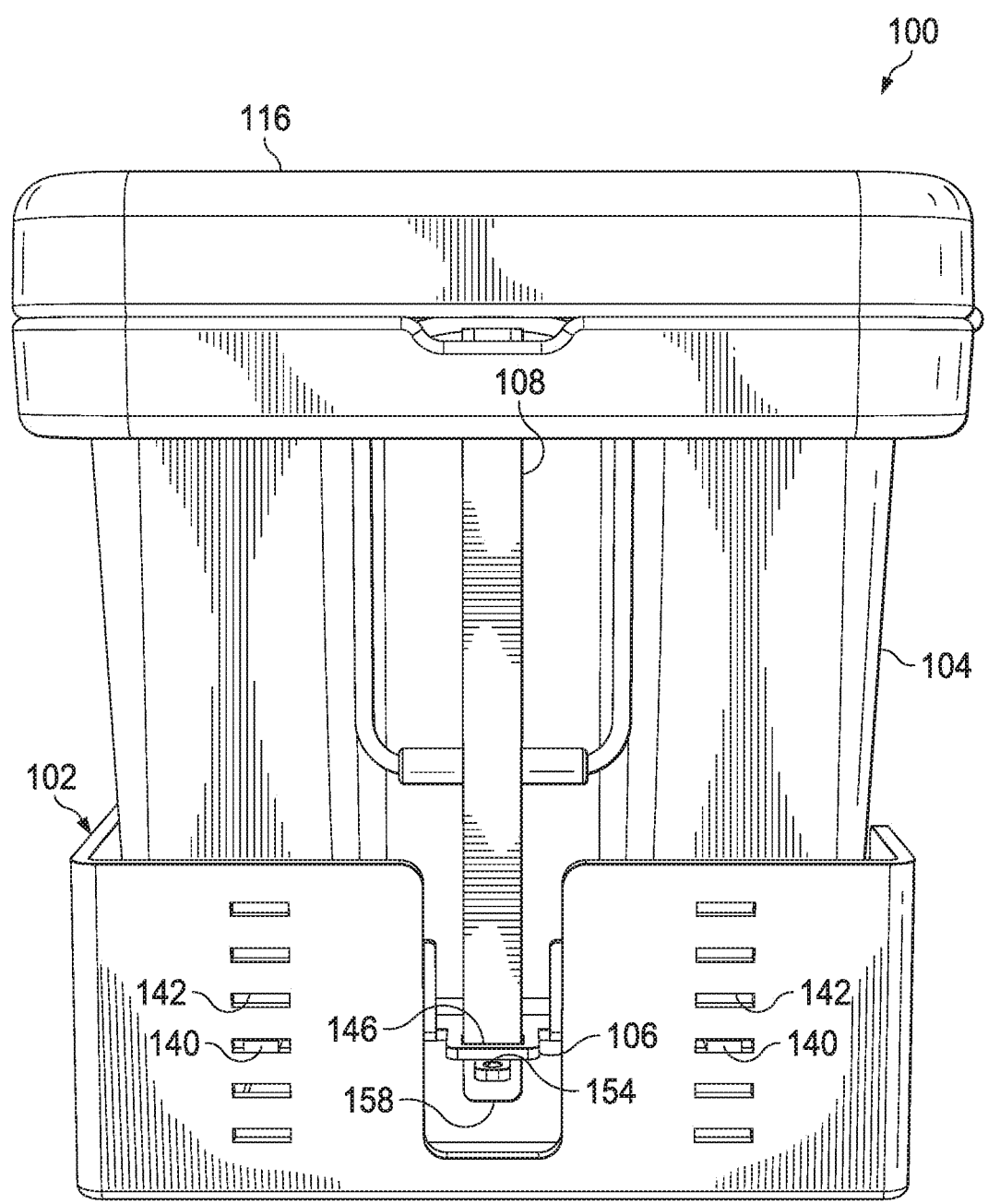
FIG. 3 is a side view of an embodiment of a storage container securing system in accordance with this disclosure.

Referring now to FIG. 3, a side view of an embodiment of the securing system 100 is shown. As can be seen, the shelf 106 includes protruding tabs 140 that are configured to be inserted within vertically-aligned slots 142 in the vertical walls to allow for adjustment in the positioning of the shelf 106 with respect to the base 102. In some embodiments, the protruding tabs 140 help to maintain the position of the shelf 106 within the base 102. In some embodiments, the protrusions of the shelf 106 extend outwardly so that the securing openings 146 are located outside of an outer perimeter of the base 102. In some embodiments, the securing openings 146 are rectangular in shape and are configured to receive the coupling members 108, as will be described in more detail below.

In some embodiments, the securing system 100 includes two coupling members 108 that are configured to be inserted within the two securing openings 146 of the shelf 106. In some embodiments, the coupling members 108 are elongated members with a rectangular cross-section that is configured to fit within the rectangular securing openings 146. In some embodiments, the coupling members 108 include a locking opening 154 on an opposite second end 158 of the coupling member 108. In some embodiments, the locking openings 154 of the coupling members 108 are configured to receive the lateral locking member 110. In some embodiments, the locking openings 154 are rectangular in shape and the lateral locking member 110 has a rectangular cross-section. In some embodiments, the lateral locking member 110 may include a stop member at a first end thereof and an opening at an opposite second end thereof configured to receive a locking mechanism, such as a combination lock (not shown), a clevis pin, a locking pin, or other device to secure the lateral locking member 110 to the coupling members 108 and the shelf 106. When a lock is secured in the locking opening 154, the lateral locking member 110 cannot be removed from the system 100, which prevents the removal of the coupling members 108 and the storage container 104 attached to the coupling members 108, while still allowing the lid 116 to be opened and closed. In some embodiments, the stop member is a bent portion of the lateral locking member 110 while in other embodiments the stop member is any feature that prevents the lateral locking member 110 from being completely pulled through the locking openings 154 of the coupling members 108.

Figure 4A:
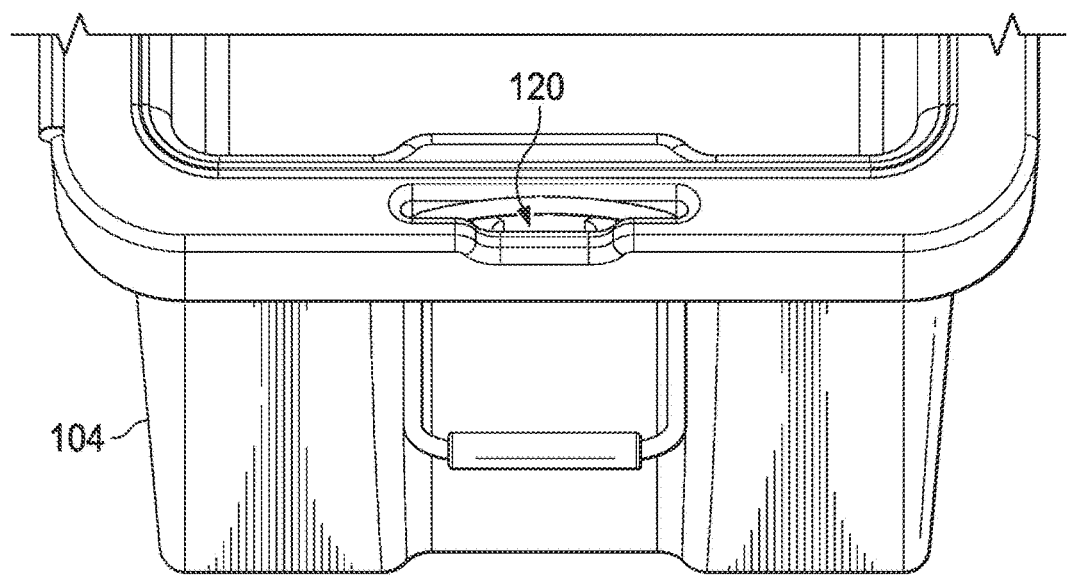
FIG. 4a is a close up side view of a storage container.
Figure 4B:
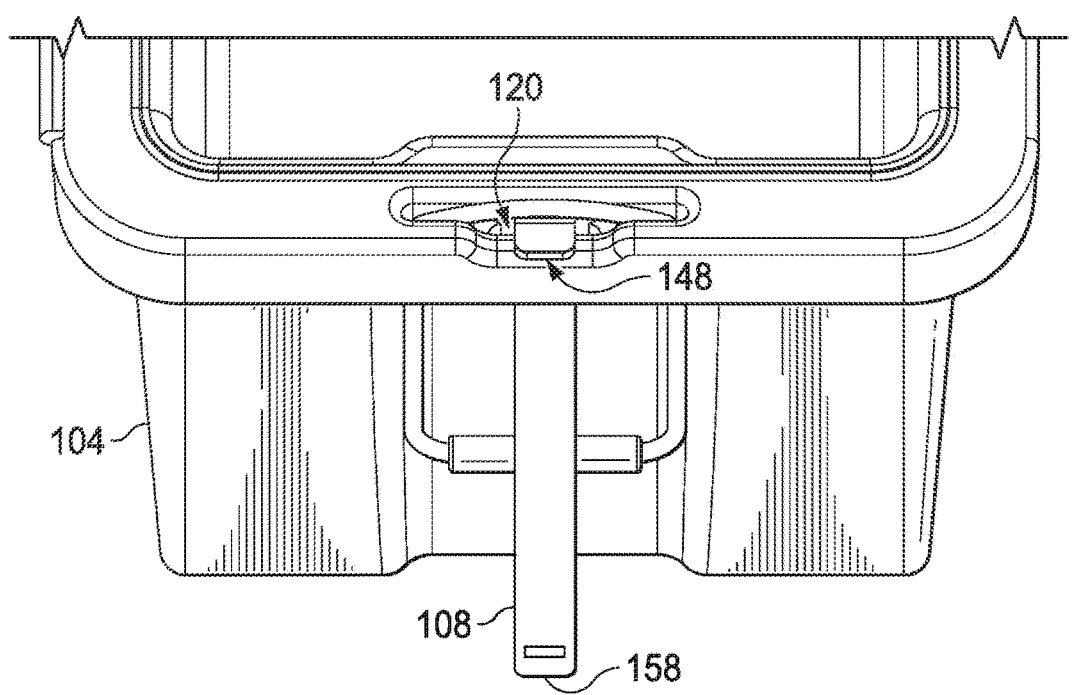
FIG. 4b is a close up side view of an embodiment of a storage container securing system in accordance with this disclosure.

Referring now to FIGS. 4a and 4b, close up views of a storage container 104 are shown illustrating an example strap slot 120 of a container 104. In use, a user places the container 104 into the securing system and positions the coupling members 108 within the strap slots 120 of the container 104 to secure the container 104 to the securing system. In the embodiment illustrated in FIG. 4a, the strap slot 120 is rectangular in shape and is positioned along a peripheral edge of the container 104. As shown in FIG. 4b, the user places the coupling member 108 within the strap slot 120 so that the second end 158 of the coupling member 108 passes through the strap slot 120 and so that the locking tab 148 of the coupling member 108 contacts a portion of the container adjacent to the strap slot 120 to prevent the coupling member 108 from passing completely through the strap slot 120. Referring again to FIG. 3, the second end 158 of the coupling member 108 passes through the securing opening 146 of the shelf 106 so that the securing opening 146 is located below the shelf 106. With a lock in the locking opening 154, the container 104 is secured to the shelf 106 and the base 102 such that the container 104 cannot be removed from the surface to which the system 100 is secured. The lid 116 of the container 104 is still accessible to allow the container owner to conveniently access the contents of the container 104.

The foregoing describes only some embodiments of the invention(s), and alterations, modifications, additions and/or changes can be made thereto without departing from the scope and spirit of the disclosed embodiments, the embodiments being illustrative and not restrictive. For example, while in some embodiments a user couples the securing system 100 to a separate surface, for example by securing the system 100 to a bed of a pickup truck with one or more bolts, in other embodiments some of the components of the securing system 100 are integrally formed with a separate surface, such as, the bed of a pickup truck. For example, in some embodiments the truck bed includes one or more securing openings that are integrally formed with the bed and are configured to receive the second end of the coupling members 108. In use, the user places the coupling members 108 through the strap slots 120 of a storage container 104 and then places the second end of the coupling member 108 into the securing openings that are integrally formed with the truck bed. The user can then secure the coupling members 108 to the securing openings of the truck bed by placing a lateral locking member 110 through the locking openings and beneath a portion of the truck bed. In other embodiments, the coupling members 108 are secured to the truck bed using other locking features, such as one or more laches that are integrated into the securing openings of the truck bed. In yet other embodiments, the base 102 is integrally formed with the truck bed and an adjustable shelf 106 is positioned within the integrally-formed base 102. In other embodiments, other features of the securing system 100 are integrated into a truck bed or other surface to secure a container 104 to the truck bed or other surface.

Figure 5:
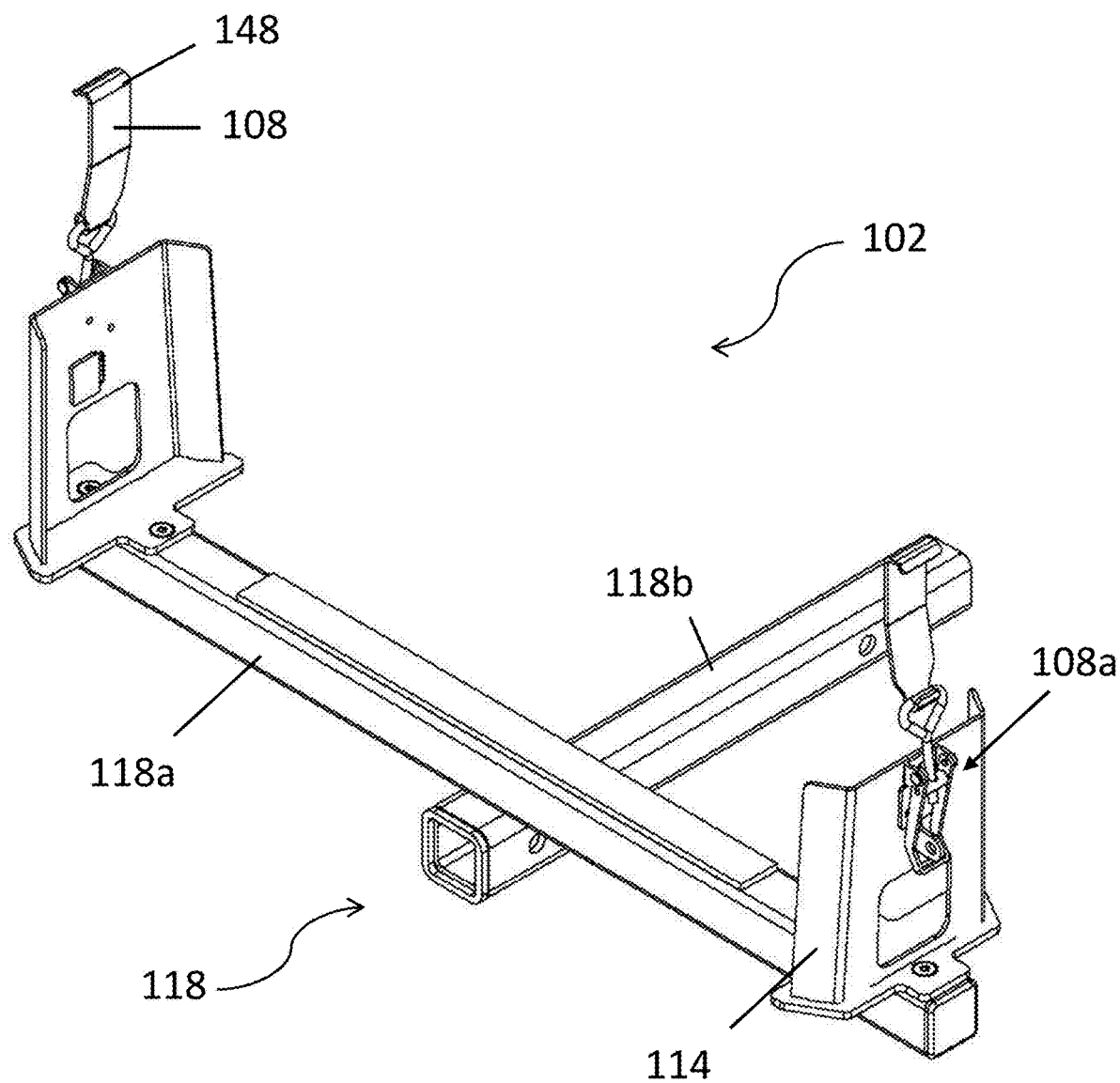
FIG. 5 is a perspective view of a base, two slidable inserts, two coupling members, and a trailer hitch mount of an alternative embodiment of a storage container securing system in accordance with this disclosure.
Figure 6:
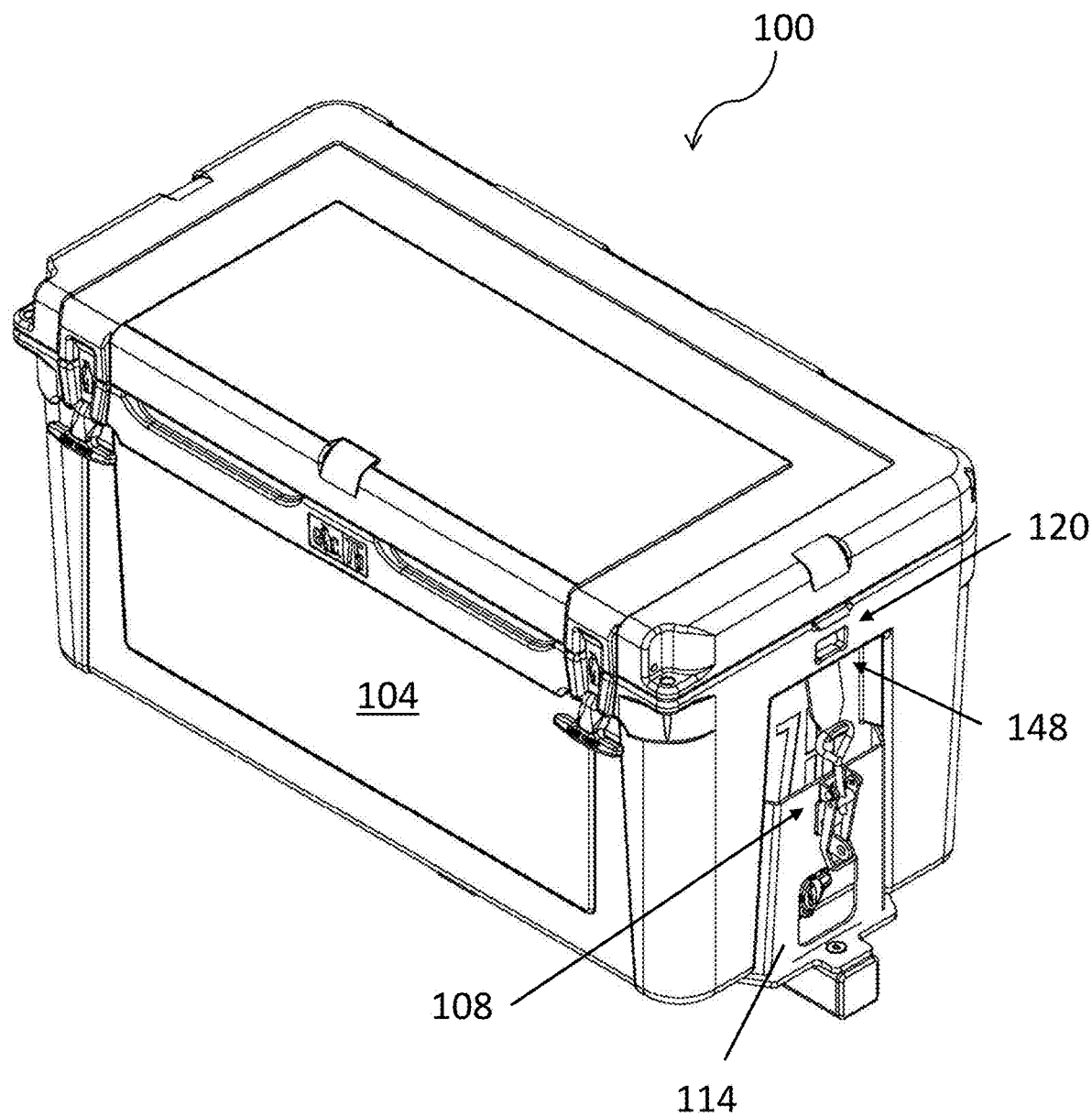
FIG. 6 is a perspective view of a storage container securing system securing a storage container in accordance with this disclosure.

Referring now to FIG. 5, an alternative embodiment of a storage securing system is shown for securing a storage container, such as the one described in U.S. Pat. No. 8,925,752, entitled "Modular Cooler System," which is hereby incorporated by reference. In the embodiment shown, the storage securing system comprises a base 102 having a mounting platform 118 and two slidable inserts 114 on either end thereof. In various embodiments, the mounting platform 118 may include a lateral bar 118a secured to a perpendicular hitch-mount 118b. Each slidable insert 114 has a coupling member 108 secured to an outer surface thereof. In various embodiments, the coupling member 108 may include a latch 108a having a locking tab 148 on a distal end thereof. Referring now to FIG. 6, the storage securing system 100 is shown having a storage container 104 secured therein. As can be seen, the slidable inserts 114 are configured to slide into corresponding slots in the storage container 104 and the locking tabs 148 of the coupling members 108 are configured to hook into strap slots 120 on the storage container 104.

In other embodiments, the slidable inserts can slide along a support beam with a spring mechanism embedded therein to allow for equal movement of each bracket relative to the other. In some embodiments, the support beam can be pivotably mounted to the hitch-support beam to allow for rotational movement at the end of the hitch-support beam. In other embodiments, the hitch-support beam can be outwardly-slidable relative to the vehicle to allow for storage containers of varying width. In the preceding embodiment, it is contemplated that the slidable hitch-support beam could incorporate a pivotably mounted storage container beam, such that the hitch-support beam could be extended from the vehicle and the storage container rotated such that the storage container can sit at any angle relative to the vehicle as opposed to only perpendicular. This embodiment would allow for varying positions of the storage container once the vehicle has been positioned in a particular spot. In other embodiments, the hitch-support beam can be adjusted along a vertical axis, relative to the vehicle, to facilitate storage containers of varying height.

Figure 7:
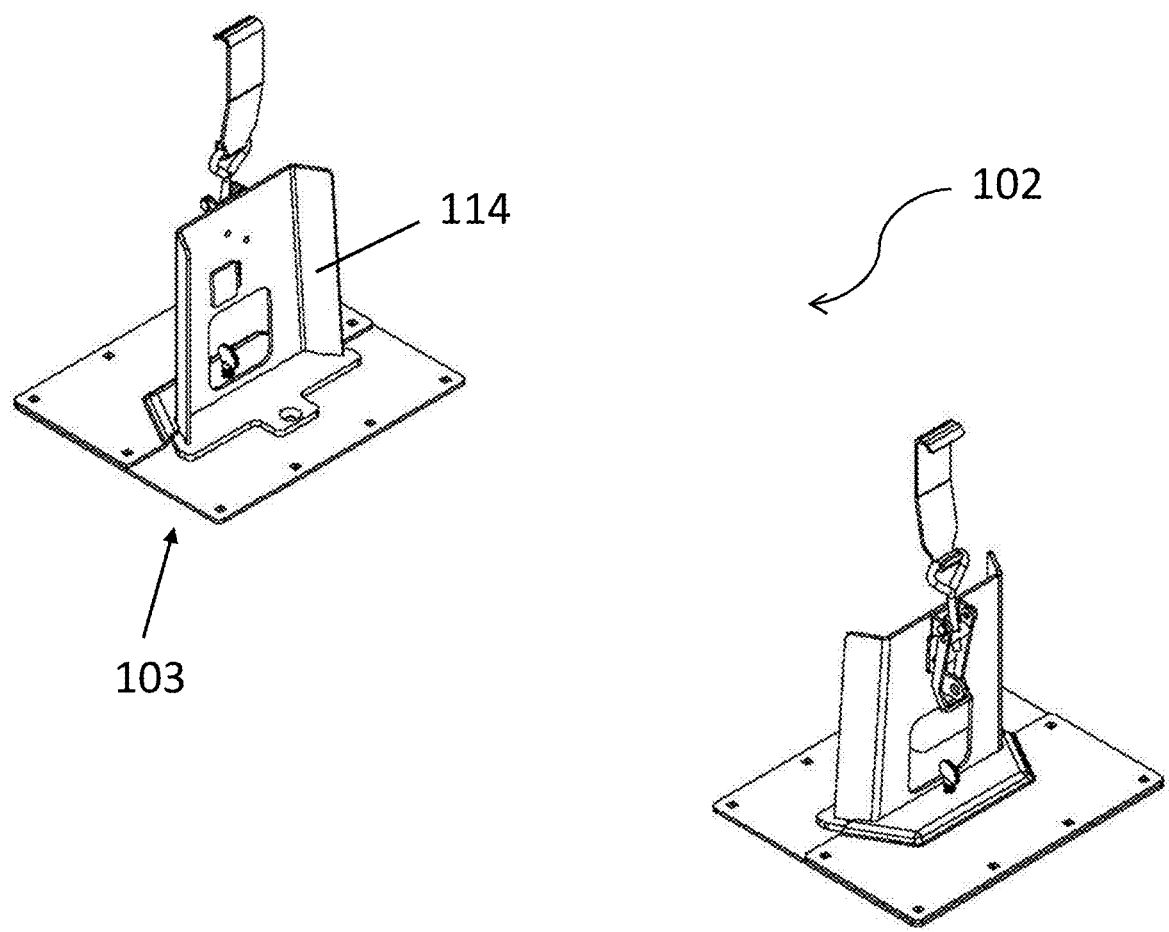
FIG. 7 is a perspective view of two slidable inserts and two coupling members of an alternative embodiment of a storage container securing system in accordance with this disclosure.
Figure 8:
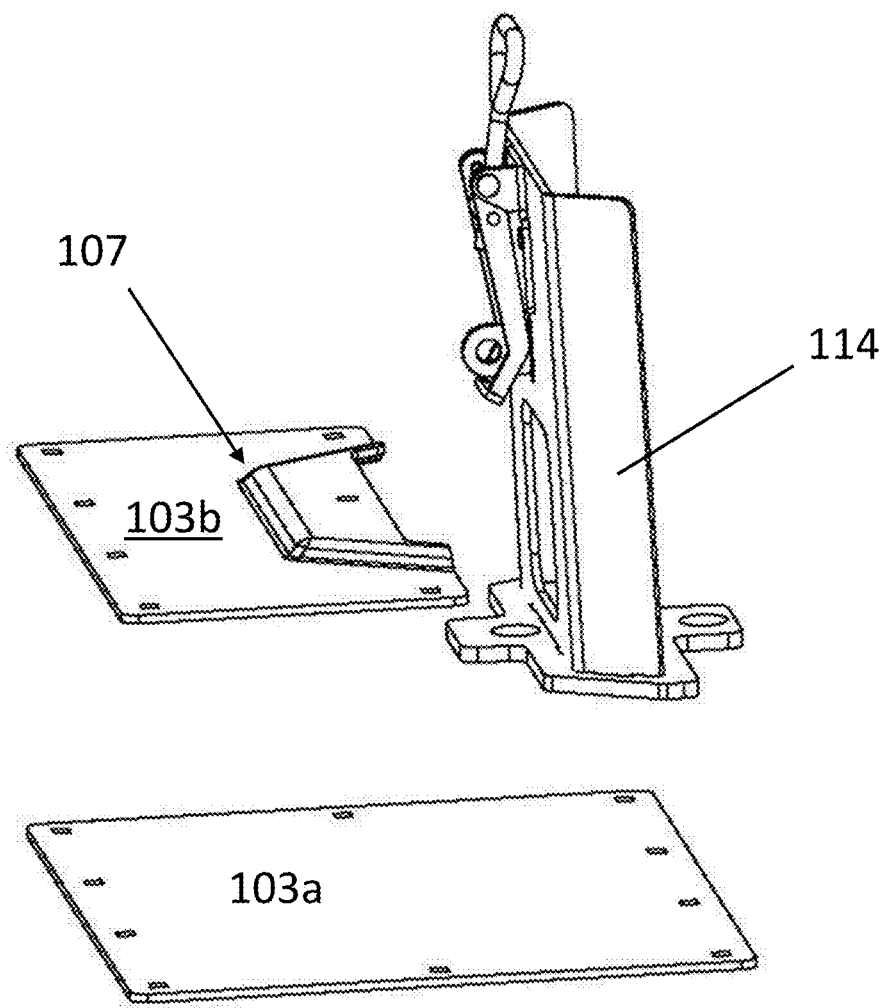
FIG. 8 is an exploded view of a slidable insert and an embodiment of a mounting base of a storage container securing system in accordance with this disclosure.

Referring now to FIG. 7, an alternative embodiment of a storage securing system is shown for securing a storage container. In the embodiment shown, the base 102 of the storage securing system 100 comprises two mounting plates 103, each having a slidable insert 114 secured thereto. Referring now to FIG. 8, an exploded view of the storage securing system of FIG. 7 is shown. In the embodiment shown, the mounting plate 103 comprises a lower mounting plate 103a and an upper mounting plate 103b. As can be seen, the lower mounting plate 103a may be secured to a surface, such as a truck bed, and the upper mounting plate 103b may be secured to a top surface thereof. In use, the slidable insert 114 is configured to be slid into a slot 107 in the upper mounting plate 103b and secured therein. In various embodiments, the slidable insert 114 may be secured to the mounting plates via a screw, a pin, or other device. In some embodiments, the slidable insert 114 may be held in place by the storage container once it has been placed over the slidable inserts 114. In various embodiments, the mounting plate 103 may allow for adjustment to accommodate varying size storage containers. In various embodiments, the lower mounting plates 103a may be secured within tracks to facilitate securement of storage containers of various sizes.

Figure 9:
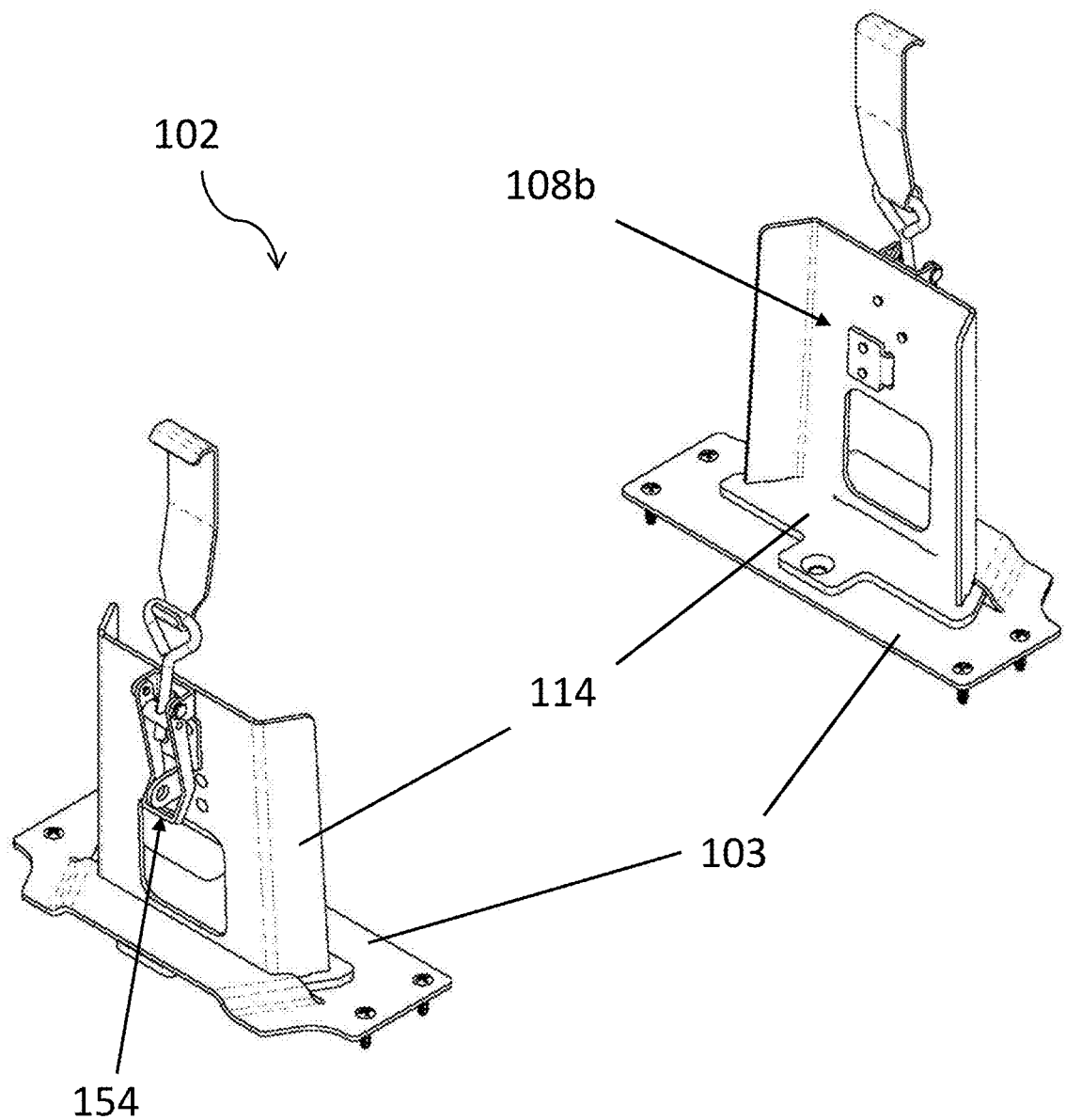
FIG. 9 is a perspective view of two slidable inserts and two coupling members of an alternative embodiment of a storage container securing system in accordance with this disclosure.

Referring now to FIG. 9, an alternative embodiment of a storage securing system is shown for securing a storage container. In the embodiment shown, the base 102 of the storage securing system comprises two mounting plates 103, each having a slidable insert 114 secured thereto. In the embodiment shown, the mounting plate 103 may be secured to a surface, such as a truck bed or boat hull. In use, the slidable insert 114 is configured to be slid into a slot in the mounting plate 103 and secured therein. In various embodiments, the slidable insert 114 may be secured to the mounting plates 103 via a screw, a pin, or other device. In some embodiments, the slidable insert 114 may be held in place by the storage container once it is placed over the slidable inserts 114. In the embodiment shown, at least one of the latches of the coupling members includes a locking opening 154 for receipt of a locking device, such as a pad lock. As can be seen, the latch has been secured to the external surface of the slidable insert 114. In some embodiments, the locking opening 154 may include a tab 108b or other protrusion that extends through the slidable insert 114 and is secured to an internal surface to provide additional securement.

Figure 10A:
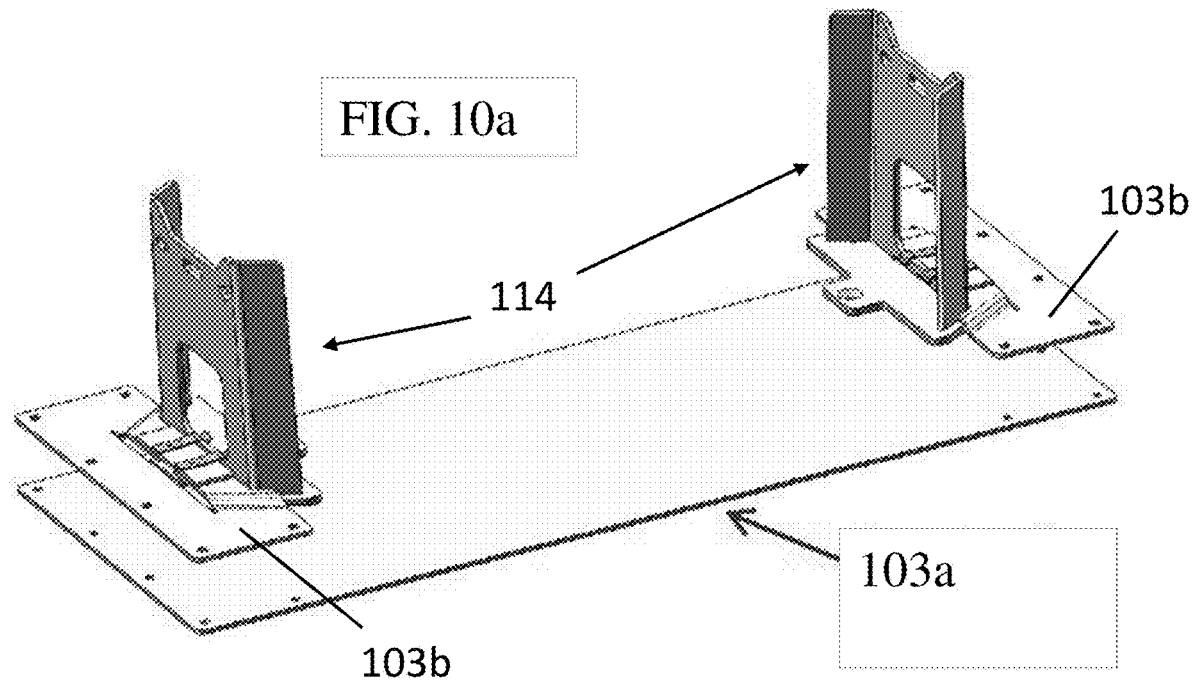
FIGS. 10a and 10b are perspective views of an alternative embodiment of a storage container securing system in accordance with this disclosure.
Figure 10B:
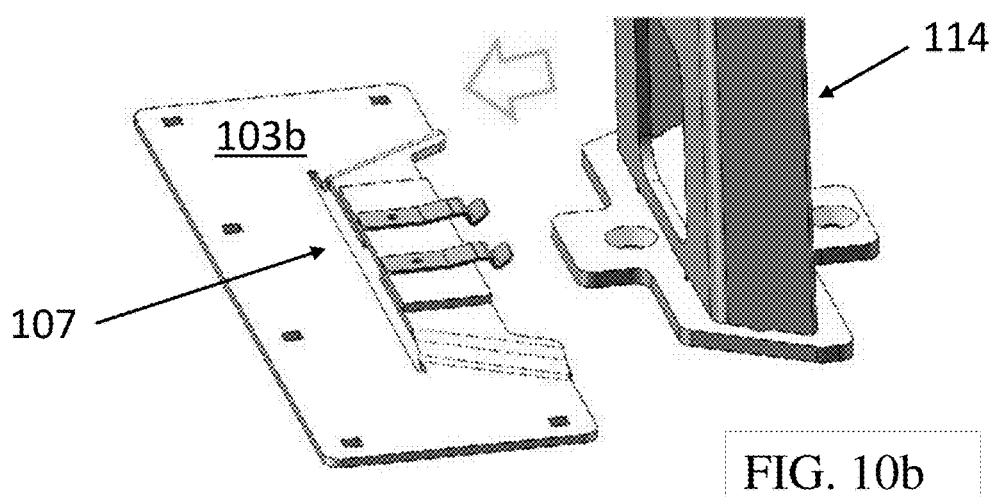

Referring now to FIGS. 10a and 10b, an alternative embodiment of a storage securing system is shown for securing a storage container. In the embodiment shown, the base of the storage securing system comprises a single lower mounting plate 103a and two upper mounting plates 103b. In the embodiment shown, the lower mounting plate 103a may be secured to a surface, such as a truck bed or boat hull. In use, the two slidable inserts 114 are configured to be slid into slots 107 in the upper mounting plates 103b and secured therein. As shown in FIG. 10b, in various embodiments, the slidable insert 114 may be secured in the slot 107 of the upper mounting plates 103b via one or more tension clips.

Figure 11:
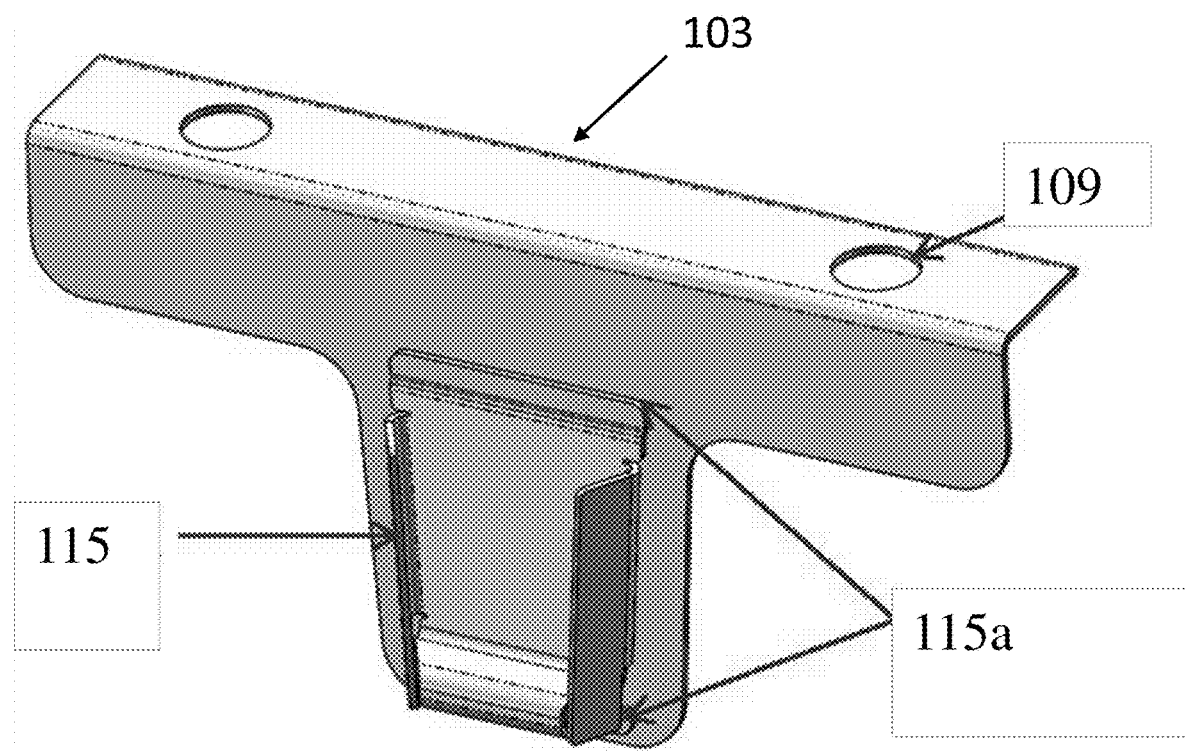
FIG. 11 is a perspective view of an alternative embodiment of a storage container securing system in accordance with this disclosure.

Referring now to FIG. 11, an alternative embodiment of a storage securing system is shown for securing a storage container. In the embodiment shown, the base of the storage securing system comprises a vertical mounting plate 103 having a receiving slot 115 secured thereto. In some embodiments, the receiving slot 115 may be integrally formed with the mounting plate 103 or may be secured thereto, such as by welding at upper and lower ends 115a thereof. In the embodiment shown, the mounting plate 103 may be secured against a vertical surface, such as a side of a truck bed or UTV. In use, the receiving slot 115 is configured to receive a corresponding protrusion of a storage container to secure the storage container therein. In various embodiments, the vertical mounting plate 103 may include a generally perpendicular lip configured to be secured to a horizontal surface, such as the top of the sidewalls of a truck bed or UTV. It is further contemplated that the L-shaped mounting plate can be mounted such that the storage container may be secured either on the inside or outside of the bed of a truck, trailer and/or ATV/UTV. The horizontal surface of the vertical mounting plate 103 may include holes 109 or slots configured to receive plungers, screws, pins, or other devices for securing the vertical mounting plate 103 in place. In some embodiments, the L-shaped bracket can be replace with a U-shaped bracket to allow for quick relocation to the storage container, for example, the storage container can be stored on the inside of a trailer bed while in travel and can quickly be latched to an opposite side of the U-shaped bracket when the trailer is no longer in travel.

Figure 12:
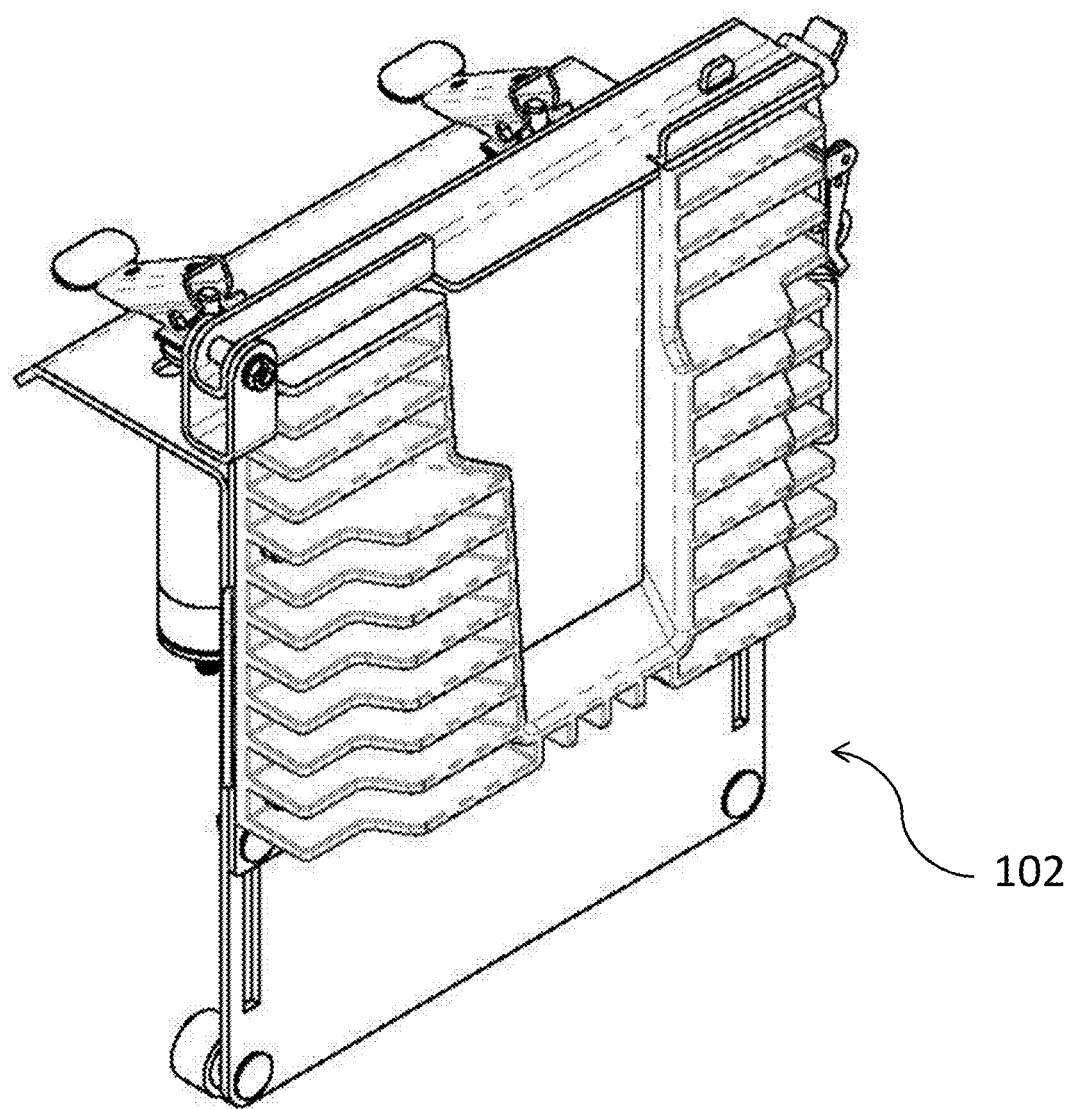
FIG. 12 is a perspective view of an alternative embodiment of a storage container securing system in accordance with this disclosure.
Figure 13:
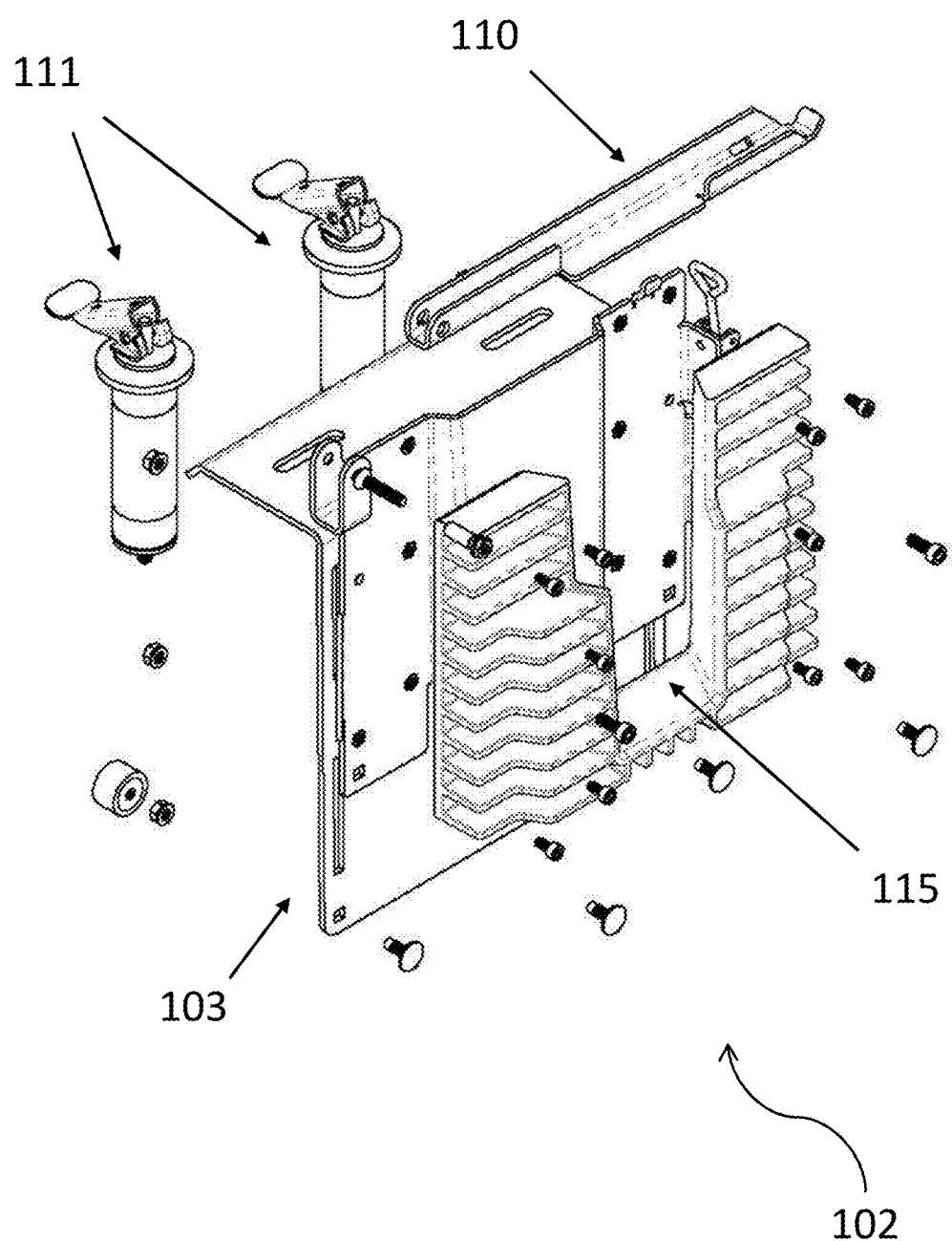
FIG. 13 is an exploded view of the storage container securing system of FIG. 12.
Figure 14:
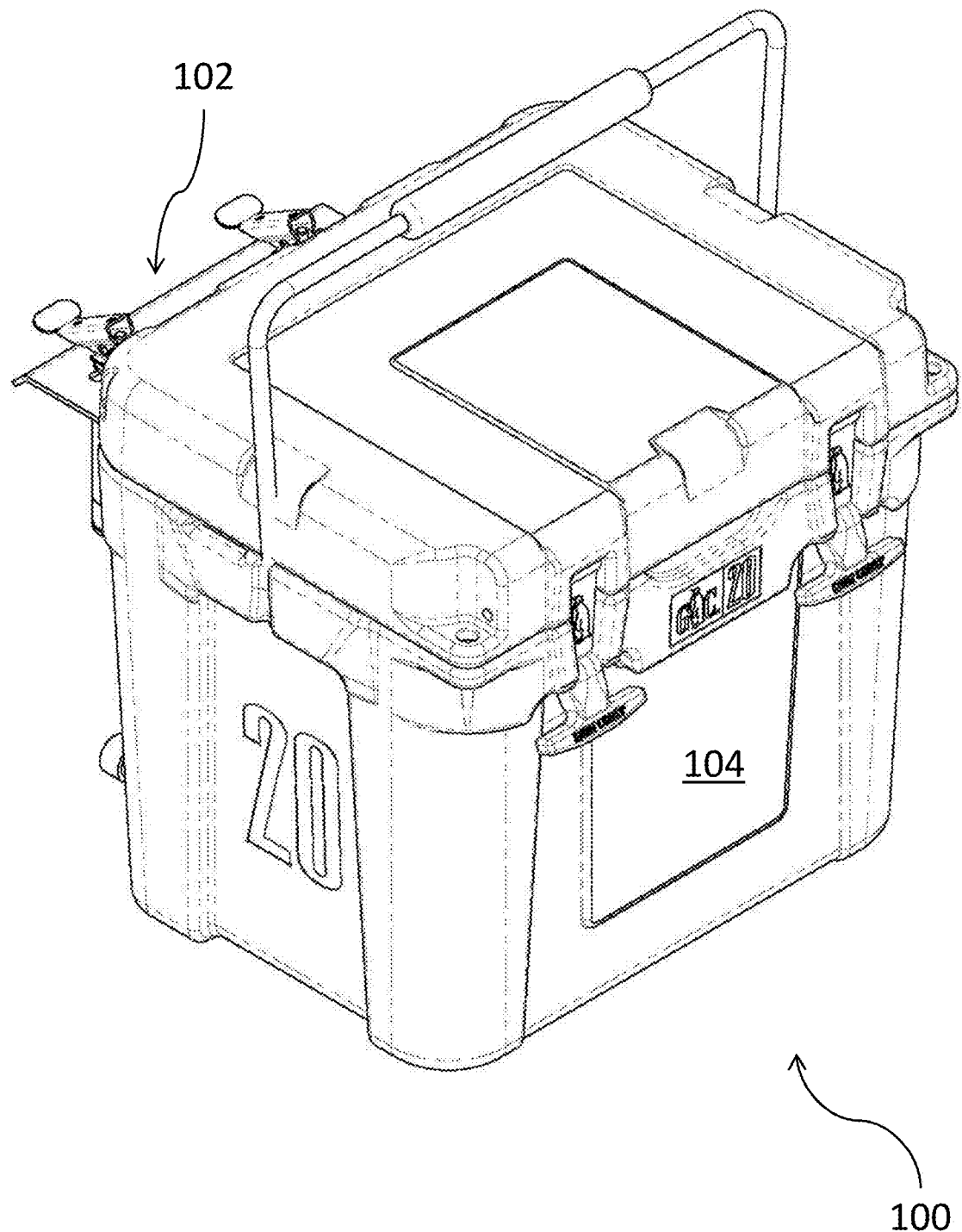
FIG. 14 is a perspective view of the storage container securing system of FIG. 12.

Referring now to FIGS. 12 and 13, an alternative embodiment of a storage securing system is shown for securing a storage container. In the embodiment shown, the base 102 of the storage securing system comprises a vertical mounting plate 103 having a receiving slot 115 secured thereto. In the embodiment shown, the mounting plate 103 may be secured to a vertical surface, such as a side of a truck bed or UTV. In various embodiments, the vertical mounting plate 103 may include a generally perpendicular lip configured to be secured to a horizontal surface, such as the top of the sidewalls of a truck bed or UTV. The horizontal surface of the vertical mounting plate 103 may include holes or slots configured to receive plungers 111 for securing the vertical mounting plate 103 in place. In use, the receiving slot 115 is configured to receive a corresponding protrusion of a storage container. Once the protrusion has been fully inserted into the receiving slot 115, a lateral locking member 110 may be rotated about a pivot pin and locked in place, for example with a latch, to secure the storage container within the receiving slot 115. Referring now to FIG. 14, a storage securing system 100 is shown with a storage container 104 secured therein.

Figure 15:
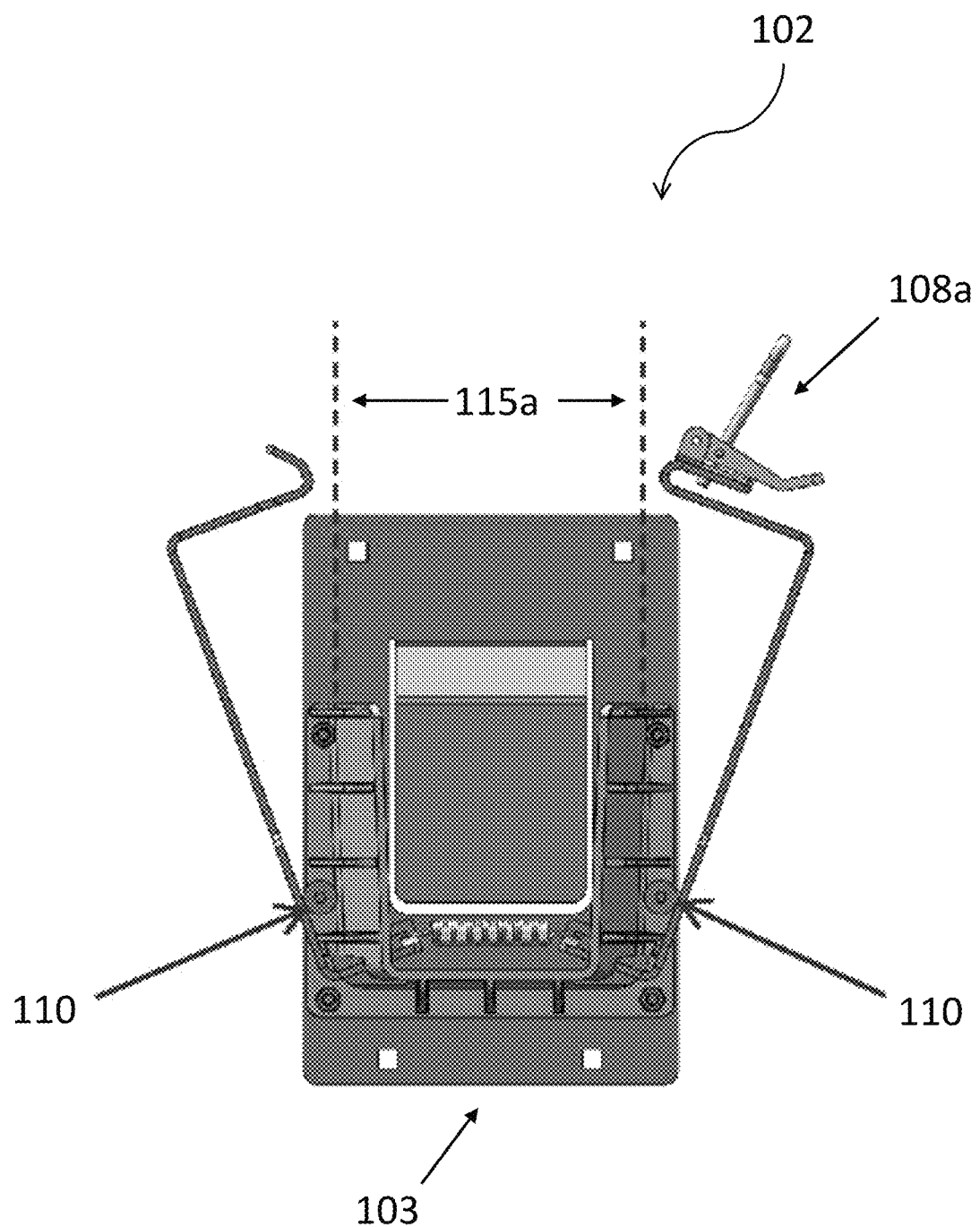
FIG. 15 is a front view of an alternative embodiment of a storage container securing system in accordance with this disclosure.

Referring now to FIG. 15, an alternative embodiment of a storage securing system is shown for securing a storage container. In the embodiment shown, the base 102 of the storage securing system comprises a vertical mounting plate 103 having a receiving slot secured thereto. The receiving slot has a width (115a) configured to receive a protrusion of a storage container. In various embodiments, locking arms 110 may be biased in an opened position using a spring, weights, or other force. In use, as the protrusion of the storage container slides into the receiving slot, the locking arms 110 are forced closed and may be secured using latch 108a.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and "right", "front" and "rear", "top" and "bottom" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Furthermore, invention(s) have been described in connection with what are presently considered to be the most practical and preferred embodiments and it is to be understood that the inventions are not to be limited to the disclosed embodiments, but on the contrary, are intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A storage container securing system, comprising:

first and second slidable inserts each having upper and lower surfaces with a protrusion extending from the upper surfaces;

the first and second slidable inserts being configured to be removably secured to a base and spaced apart a distance corresponding to a length of a storage container to be secured between the protrusions of the first and second slidable inserts;

first and second coupling members secured to the an outer surface of the protrusions of respective ones of the first and second slidable inserts, wherein each coupling member comprises a latch on a first end of the coupling member and a locking tab on an opposite, second end of the coupling member, the locking tab having a bend on an end thereof configured to hook onto a slot of the storage container to be secured; and wherein, when the first and second slidable inserts are secured to the base, the latches of the first and second coupling members may be utilized to selectively lock the storage container to the base.

2. The storage container securing system of claim 1, wherein the latch includes a locking opening therein for receipt of a locking device therethrough.

3. The storage container securing system of claim 1, wherein the base forms part of an automobile body.

4. The storage container securing system of claim 1, wherein the locking tab of the coupling member is a flat piece of metal having bends therein configured to allow a lid of the storage container to fully close when the locking tab is hooked onto the slot thereof.

5. The storage container securing system of claim 1, wherein the coupling member has a rectangular cross section.

* * * * *